(12) United States Patent
Saha et al.

(10) Patent No.: US 11,288,769 B2
(45) Date of Patent: Mar. 29, 2022

(54) SYSTEM AND METHOD FOR STITCHING IMAGES USING NON-LINEAR OPTIMIZATION AND MULTI-CONSTRAINT COST FUNCTION MINIMIZATION

(71) Applicant: Tata Consultancy Services Limited, Mumbai (IN)

(72) Inventors: Arindam Saha, Kolkata (IN); Soumyadip Maity, Kolkata (IN); Brojeshwar Bhowmick, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 58 days.

(21) Appl. No.: 16/830,328

(22) Filed: Mar. 26, 2020

(65) Prior Publication Data
US 2020/0327642 A1    Oct. 15, 2020

(30) Foreign Application Priority Data

Apr. 15, 2019    (IN) .............................. 201921015123

(51) Int. Cl.
*G06T 3/40*    (2006.01)
*G06T 3/00*    (2006.01)
(Continued)

(52) U.S. Cl.
CPC .......... *G06T 3/4038* (2013.01); *G06T 3/0093* (2013.01); *G06T 3/4007* (2013.01);
(Continued)

(58) Field of Classification Search
CPC ... G06T 3/4038; G06T 3/0093; G06T 3/4007; G06T 5/002; G06T 5/50; G06T 17/205
(Continued)

(56) References Cited

U.S. PATENT DOCUMENTS

| 2014/0118402 A1 | 5/2014 | Gallo et al. |
| 2016/0142643 A1 | 5/2016 | Jiang et al. |

(Continued)

FOREIGN PATENT DOCUMENTS

| CN | 105389787 A | 3/2016 |
| CN | 109118429 A | 1/2019 |

*Primary Examiner* — Ayodeji O Ayotunde
(74) *Attorney, Agent, or Firm* — Finnegan, Henderson, Farabow, Garrett & Dunner LLP

(57) ABSTRACT

The present disclosure provides a system and a method for stitching images using non-linear optimization and multi-constraint cost function minimization. Most of conventional homography based transformation approaches for image alignment, calculate transformations based on linear algorithms which ignore parameters such as lens distortion and unable to handle parallax for non-planar images resulting in improper image stitching with misalignments. The disclosed system and the method generates initial stitched image by estimating a global homography for each image using estimated pairwise homography matrix and feature point correspondences for each pair of images, based on a non-linear optimization. Local warping based image alignment is applied on the initial stitched image, using multi-constraint cost function minimization to mitigate aberrations caused by noises in the global homography estimation to generate the refined stitched image. The refined stitched image is accurate and free from misalignments and poor intensities.

20 Claims, 12 Drawing Sheets

(51) Int. Cl.
  *G06T 5/00* (2006.01)
  *G06T 5/50* (2006.01)
  *G06T 17/20* (2006.01)

(52) U.S. Cl.
  CPC ............. *G06T 5/002* (2013.01); *G06T 5/50* (2013.01); *G06T 17/205* (2013.01)

(58) Field of Classification Search
  USPC ........................................................ 382/100
  See application file for complete search history.

(56) References Cited

U.S. PATENT DOCUMENTS

2016/0358355 A1* 12/2016 Lin ..................... G06K 9/4638
2018/0174327 A1*  6/2018 Singh ....................... B60R 1/00
2020/0020075 A1*  1/2020 Khwaja ................. G06T 5/002

* cited by examiner

SYSTEM AND METHOD FOR STITCHING IMAGES USING NON-LINEAR OPTIMIZATION AND MULTI-CONSTRAINT COST FUNCTION MINIMIZATION

PRIORITY CLAIM

This U.S. patent application claims priority under 35 U.S.C. § 119 to: Indian Patent Application No. 201921015123, filed on 15 Apr. 2019. The entire contents of the aforementioned application are incorporated herein by reference.

TECHNICAL FIELD

The disclosure herein generally relates to image processing, and particularly to a system and a method for stitching overlapped images of a scene using non-linear least-square optimization and multi-constraint cost function minimization.

BACKGROUND

Stitching overlapped images of a large scene with better accuracy is an important aspect for investigation and conducting measurements pertaining to big and complex structures such as a bridge, rail tracks etc.

Direct image alignment approaches in state of art for image stitching determines homography between two overlapped images using all overlapped pixel information, by calculating a suitable homography matrix and by minimizing intensity differences of the overlapped pixels. But the direct image alignment approaches requires a higher execution time and have limited range of convergence of associated cost functions.

Some of the existing art also deal with feature based image alignment approaches that are robust and faster than the direct image alignment approaches, which calculate the homography for each image pair using matched features of the images comprised in the image pair. There are two main feature based image alignment approaches, namely (i) homography based transformation and (ii) content-preserving warping, for aligning the overlapped images. Major advantage of homography based transformation approach is that it aligns the overlapped images globally and thus preserves structural properties of the overlapped images and avoids local distortions. However conventional homography based transformation approaches calculate transformations based on linear algorithms, which ignore lens distortion and are unable to handle parallax in case of non-planar scenes, resulting in misalignments in the stitched image.

SUMMARY

Embodiments of the present disclosure present technological improvements as solutions to one or more of the above-mentioned technical problems recognized by the inventors in conventional systems.

In an aspect, there is provided a computer implemented method for stitching overlapped images of a scene, the method comprising the steps of: receiving a plurality of the overlapped images of the scene; forming a list of pairs of the overlapped images from the plurality of the overlapped images, wherein each pair of the overlapped images comprises a unique pair of the overlapped images; determining feature point correspondences $\varphi_{noisy}$, for each pair of the overlapped images in the list, based on an associated first set of matched feature point correspondences $\psi_1$ and an associated second set of matched feature point correspondences $\psi_2$; generating a pairwise homography matrix and a set of inlier point correspondences $\varphi$, for each pair of the overlapped images based on associated feature point correspondences $\varphi_{noisy}$, using a Direct Linear Transformation (DLT) method with a Random Sampling Consensus (RANSAC) process, wherein the set of inlier point correspondences $\varphi$ are generated by removing outlier point correspondences from the associated feature point correspondences $\varphi_{noisy}$ based on the associated pairwise homography matrix; estimating a global homography for each overlapped image of each pair of the overlapped images, based on the associated pairwise homography matrix and the associated set of inlier point correspondences $\varphi$, using a cost function $C_w$ with a non-linear least-square optimization, to generate an initial stitched image; and minimizing a multi-constraint cost function $C_L$ with a local warping technique to reduce misalignments in overlapped regions and edge boundaries of the initial stitched image, to generate a refined stitched image, wherein the multi-constraint cost function $C_L$ comprises a data terms cost function $C_D$, a photometric terms cost function $C_P$ and a geometric smoothness terms cost function $C_G$.

In another aspect, there is provided a system for stitching overlapped images of a scene, the system comprising: one or more data storage devices operatively coupled to one or more hardware processors and configured to store instructions which when executed cause the one or more hardware processors to: receive a plurality of the overlapped images of the scene; form a list of pairs of the overlapped images from the plurality of the overlapped images, wherein each pair of the overlapped images comprises a unique pair of the overlapped images; determine feature point correspondences $\varphi_{noisy}$, for each pair of the overlapped images in the list, based on an associated first set of matched feature point correspondences $\psi_1$ and an associated second set of matched feature point correspondences $\psi_2$; generate a pairwise homography matrix and a set of inlier point correspondences $\varphi$, for each pair of the overlapped images based on associated feature point correspondences $\varphi_{noisy}$, using a Direct Linear Transformation (DLT) method with a Random Sampling Consensus (RANSAC) process, wherein the set of inlier point correspondences $\varphi$ are generated by removing outlier point correspondences from the associated feature point correspondences $\varphi_{noisy}$ based on the associated pairwise homography matrix; estimate a global homography for each overlapped image of each pair of the overlapped images, based on the associated pairwise homography matrix and the associated set of inlier point correspondences $\varphi$, using a cost function $C_w$ with a non-linear least-square optimization, to generate an initial stitched image; and minimize a multi-constraint cost function $C_L$ with a local warping technique to reduce misalignments in overlapped regions and edge boundaries of the initial stitched image, to generate a refined stitched image, wherein the multi-constraint cost function $C_L$ comprises a data terms cost function $C_D$, photometric terms cost function $C_P$ and geometric smoothness terms cost function $C_G$.

In yet another aspect, there is provided a computer program product comprising a non-transitory computer readable medium having a computer readable program embodied therein, wherein the computer readable program, when executed on a computing device, causes the computing device to: receive a plurality of the overlapped images of the scene; form a list of pairs of the overlapped images from the plurality of the overlapped images, wherein each pair of the overlapped images comprises a unique pair of the overlapped images; determine feature point correspondences $\varphi_{noisy}$, for each pair of the overlapped images in the list, based on an associated first set of matched feature point correspondences $\psi_1$ and an associated second set of matched feature point correspondences $\psi_2$; generate a pairwise homography matrix and a set of inlier point correspondences $\varphi$, for each pair of the overlapped images based on associated feature point correspondences $\varphi_{noisy}$, using a Direct Linear Transformation (DLT) method with a Random Sampling Consensus (RANSAC) process, wherein the set of inlier point correspondences $\varphi$ are generated by removing outlier point correspondences from the associated feature point correspondences $\varphi_{noisy}$ based on the associated pairwise homography matrix; estimate a global homography for each overlapped image of each pair of the overlapped images, based on the associated pairwise homography matrix and the associated set of inlier point correspondences $\varphi$, using a cost function $C_w$ with a non-linear least-square optimization, to generate an initial stitched image; and minimize a multi-constraint cost function $C_L$ with a local warping technique to reduce misalignments in overlapped regions and edge boundaries of the initial stitched image, to generate a refined stitched image, wherein the multi-constraint cost function $C_L$ comprises a data terms cost function $C_D$, photometric terms cost function $C_P$ and geometric smoothness terms cost function $C_G$.

In an embodiment of the present disclosure, the first set of matched feature point correspondences $\psi_1$ for each pair of the overlapped images, are extracted using a scale-invariant feature transform (SIFT) algorithm and a VLFeat method.

In an embodiment of the present disclosure, the second set of matched feature point correspondences $\psi_2$ from the edge boundaries of each pair of the overlapped images are extracted using a bi-directional optical flow method.

In an embodiment of the present disclosure, the cost function $C_w$ defines a transformation error in the feature point correspondences of the associated pair of the overlapped images in the initial stitched image and an error in pairwise homography calculated based on the global homography of the associated pair of overlapped images.

In an embodiment of the present disclosure, the cost function $C_w$ is defined according to a relation:

$$C_w = \sum_{I_s, I_d \in \theta} \sum_{i \in \varphi} |(H_d^{-1} H_s) x_i - x_i'|^2 + \lambda * Frob(H_{sd}, (H_d^{-1} H_s))$$

wherein $I_s$ and $I_d$ represents an image pair to be stitched, $\theta$ represents a set of image pairs from the plurality of the overlapped images, $x_i$ and $x_i'$ represents a $i^{th}$ pair of matching feature point in the images $I_s$ and $I_d$ respectively, $H_s$ represents a global homography from the image $I_s$ to the initial stitched image, $H_d$ represents a global homography from the image $I_d$ to the initial stitched image, $H_d$ represents a pairwise homography matrix, $H_d^{-1}$ represents a global homography from the initial stitched image to the image $I_d$, Frob( ) represents a Frobenius norm, and $\lambda$ represents a balancing weight.

In an embodiment of the present disclosure, the multi-constraint cost function $C_L$ is defined according to a relation:

$$C_L = C_D + \delta_1 C_P + \delta_2 C_G$$

wherein $\delta_1$ and $\delta_2$ represent balancing weights.

In an embodiment of the present disclosure, the data terms cost function $C_D$ minimizes misalignments in the feature point correspondences present in a predefined window of the overlapped regions and the edge boundaries of the initial stitched image, by reducing a distance between a mid-point of the associated feature point correspondences and the associated feature point correspondences.

In an embodiment of the present disclosure, the data terms cost function $C_D$ is defined according to a relation:

$$C_D = \sum_{i \in \varphi} |x_i^{os} - x_i^m|^2 + |x_i^{od} - x_i^m|^2$$

wherein $x_i^{os}$ and $x_i^{od}$ represent warped feature point correspondences in output warped images $I_s^o$ and $I_d^o$, and $x_i^m$ represents a mid-point of h feature point correspondence on input aligned image pair $I_s^{al}$ and $I_d^{al}$, and corresponding output warped images $I_s^o$ and $I_d^o$.

In an embodiment of the present disclosure, the photometric terms cost function $C_P$ minimizes an intensity difference among sample pixel points in the overlapped regions and pixel points on the edge boundaries of the overlapping regions, using a bicubic interpolation.

In an embodiment of the present disclosure, the photometric terms cost function $C_P$ is defined according to a relation:

$$C_P = \sum_k |I_S(x_k^o) - I_d(x_k)|^2$$

wherein $x_k$ represents a $k^{th}$ sample pixel point where $k \in \beta$ and $x_k^o$ represents a corresponding warped point obtained from a bicubic interpolation, $I_s(x_k^o)$ and $I_d(x_k)$ represents intensity of images $I_s$ and $I_d$, $\beta$ represents a point set derived using sampled pixel points in the overlapped regions and pixel points on the edge boundaries of the overlapping regions.

In an embodiment of the present disclosure, the geometric smoothness terms cost function $C_G$ minimize a difference between a warped corner point of a triangular mesh and a corner point calculated from other two warped corner points in the triangle mesh in the overlapping regions, wherein the corner point is linearly dependent on the other two warped corner points.

In an embodiment of the present disclosure, the geometric smoothness terms cost function $C_G$ is defined according to a relation:

$$C_G = \sum_{t=1}^{\Delta_n} |V_3^o - V_3^{o'}|^2$$

wherein $V_3^o$ represents a warped corner point and linearly dependent on other two warped corner points $V_1^o$ and $V_2^o$ of a warped triangle $\Delta V_1^o V_2^o V_3^o$ of a mesh in the overlapping regions, $\Delta_n$ represents a number of triangles present in the mesh, $V_3^{o'}$ represents a calculated corner point based on $V_1^o$ and $V_2^o$, and determined according to a relation:

$$V_3^{o'} = V_1^o + u(V_2^o - V_1^o) + v \begin{bmatrix} 0 & 1 \\ -1 & 0 \end{bmatrix} (V_2^o - V_1^o)$$

where u and v represent two scalars.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
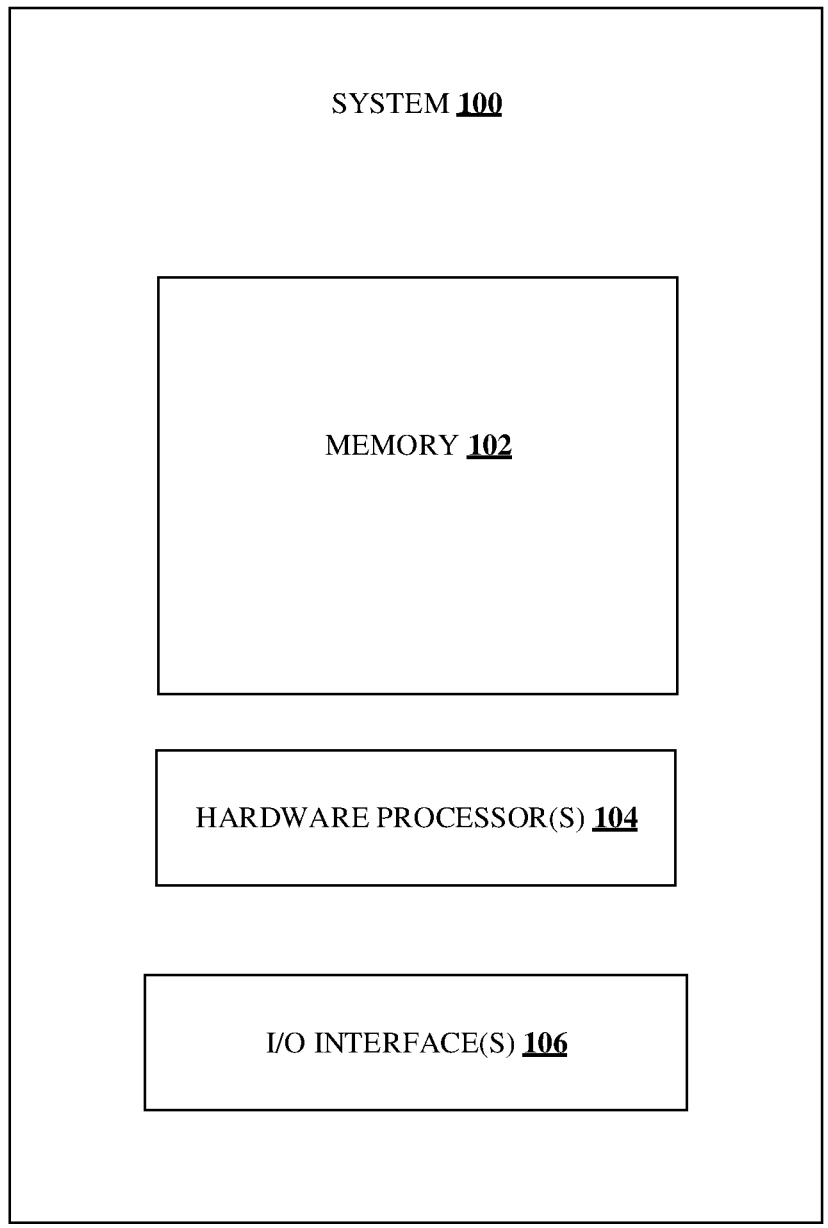
FIG. 1 is a functional block diagram of a system for stitching overlapped images of a scene, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Image stitching is a process of aligning plurality of images to generate a panoramic image. The image stitching process has three major steps namely (i) spatial calibration (ii) image alignment and (iii) blending technique. The spatial calibration reduces optical defects and perform gain correction. The image alignment calculates transformation between calibrated image pairs and aligns the images based on the transformation. The blending technique corrects misalignments of artefacts.

Direct image alignment approaches for image stitching in the state of art require higher execution time and has limited range of convergence, as they determine homography between two images using all overlapped pixel information. Feature based image alignment approaches are robust and faster compared to the direct approaches, as they calculate the homography for each image pair using associated matched features of the images comprised in the image pair. Homography based transformation and content preserving warping are two main feature based image alignment approaches present in the art. The homography based transformation approaches align the images globally and thus preserves structural properties of the image and avoids local distortion in the stitched image. However majority of the homography based transformation approaches calculate the transformation based on linear algorithms which ignore parameters such as lens distortion and are unable to handle parallax for non-planar images resulting in improper image stitching with misalignments. The content preserving warping approaches do not preserve the structural properties of the images.

In accordance with the present disclosure, technical problems of the lens distortion and the parallax errors occurred with the implementation of the linear algorithms are addressed by enabling stitching of overlapped images using non-linear optimization and multi-constraint cost function minimization. The non-linear optimization determines a global homography for each image using an estimated pairwise homography matrix and feature point correspondences for each pair of images. Local warping based image alignment is computed using multi-constraint cost function minimization to mitigate aberrations caused by noises in the global homography estimation. The multi-constraint cost function incorporates geometric as well as photometric constraints for better alignment of the images to produce accurate image stitching.

Referring now to the drawings, and more particularly to FIG. 1 through FIG. 6F, where similar reference characters denote corresponding features consistently throughout the figures, there are shown preferred embodiments and these embodiments are described in the context of the following exemplary system and a method for stitching overlapped images of a scene using non-linear optimization and multi-constraint cost function minimization.

FIG. 1 is a functional block diagram of a system for stitching overlapped images of a scene, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules or hardware processors and can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2A:
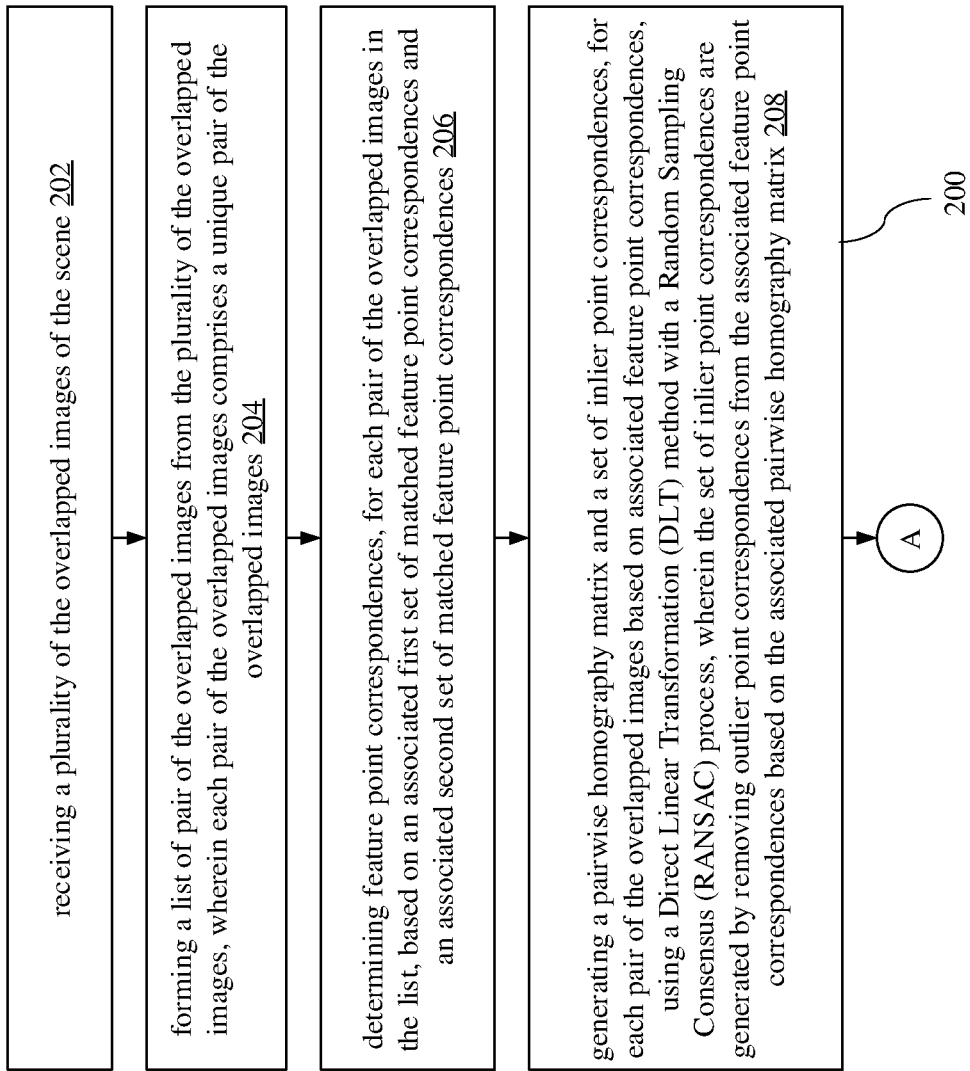
FIG. 2A and FIG. 2B illustrate a flow diagram of a processor implemented method for stitching overlapped images of a scene, in accordance with an embodiment of the present disclosure.
Figure 2B:
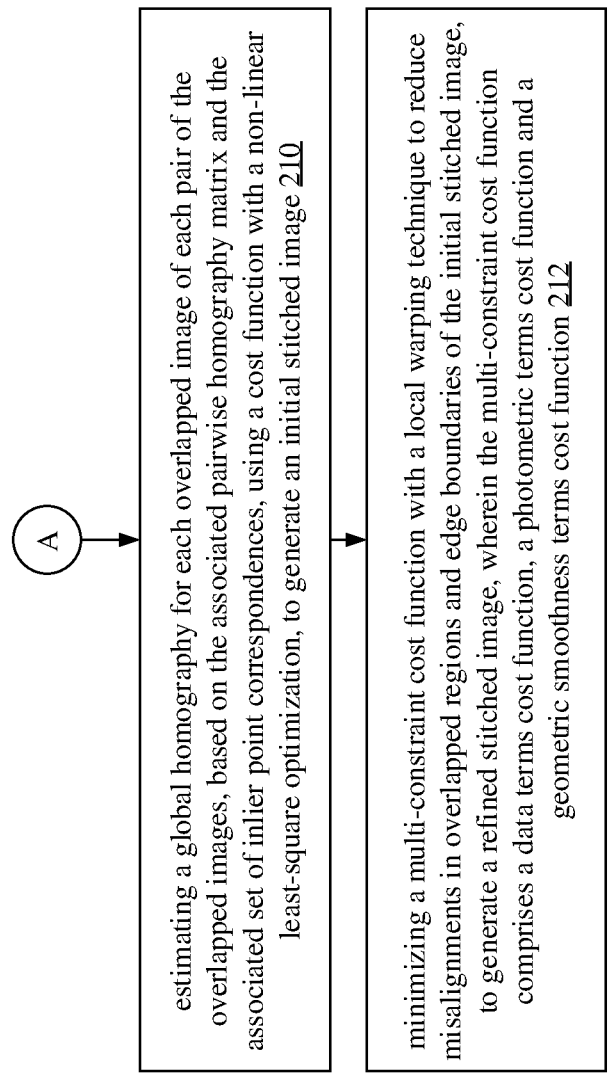

FIG. 2A and FIG. 2B illustrate a flow diagram of a processor implemented method for stitching overlapped images of a scene, in accordance with an embodiment of the present disclosure. The steps of the method 200 will now be explained in detail with reference to the system 100. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, the one or more hardware processors 104 of FIG. 1 are configured to receive, at step 202, a plurality of the overlapped images of the scene. In the context of the present disclosure, the expression 'images' refer to overlapped images or images having some overlapped regions. An amount of the overlap may be different depending on type of the scene. In an embodiment, the plurality of the overlapped images may be received from a media acquisition unit such as a camera present in the system 100, or from a storage media that may be present internally in the system 100 or present externally to the system 100. In an embodiment, the scene may be low-texture images or ordinary images with texture, including a bridge, rail tracks and so on.

In accordance with an embodiment of the present disclosure, the one or more hardware processors 104 of FIG. 1 are configured to form a list of pairs of the overlapped images, at step 204 from the plurality of the overlapped images received at step 202. In an embodiment, each pair of the overlapped images comprises a unique pair of the overlapped images. For example if there are N number of the overlapped images, then number of pairs of the overlapped images is $N_{c_2}$. For example, if the number of the overlapped images are five namely: image 1, image 2, image 3, image 4 and image 5, then the list of pairs of the overlapped images are {(image 1, image 2), (image 1, image 3), (image 1, image 4), (image 1, image 5), (image 2, image 3), (image 2, image 4), (image 2, image 5), (image 3, image 4), (image 3, image 5) and (image 4, image 5)}.

In accordance with an embodiment of the present disclosure, the one or more hardware processors 104 of FIG. 1 are configured to determine feature point correspondences $\varphi_{noisy}$, at step 206, for each pair of the overlapped images in the list formed at step 204, based on an associated first set of matched feature point correspondences $\psi_1$ and an associated second set of matched feature point correspondences $\psi_2$.

In an embodiment, the first set of matched feature point correspondences $\psi_1$ for each pair of the overlapped images, are extracted using a scale-invariant feature transform (SIFT) algorithm and a VLFeat method. The Lowe's SIFT algorithm is used which extracts one or more feature points for each overlapped image and the VLFeat method extracts the set of matched feature point correspondences $\psi_1$ for each pair of the overlapped images, based on one or more feature points of the associated pair of the overlapped images.

In an embodiment, the second set of matched feature point correspondences $\psi_2$ from edge boundaries of each pair of the overlapped images are extracted using a bi-directional optical flow method. The bi-directional optical flow method determines one or more feature points present on edge boundaries of each overlapped image and extracts the second set of matched feature point correspondences $\psi_2$, based on the associated one or more feature points present on edge boundaries of each overlapped image of the associated pair of the overlapped images.

In an embodiment, the feature point correspondences noisy, for each pair of the overlapped images are determined by performing union operation between the associated first set of matched feature point correspondences $\psi_1$ and an associated second set of matched feature point correspondences $\psi_2$, and mathematically represented as:

$$\varphi_{noisy} = \psi_1 \cup \psi_2.$$

In accordance with an embodiment of the present disclosure, the one or more hardware processors 104 of FIG. 1 are configured to generate, at step 208, a pairwise homography matrix and a set of inlier point correspondences $\varphi$, for each pair of the overlapped images based on associated feature point correspondences $\varphi_{noisy}$, using a Direct Linear Transformation (DLT) method with a Random Sampling Consensus (RANSAC) process. The Direct Linear Transformation (DLT) method generates the pairwise homography matrix for each pair of the overlapped images based on associated feature point correspondences $\varphi_{noisy}$. The Random Sampling Consensus (RANSAC) process detects outlier point correspondences from the associated feature point correspondences $\varphi_{noisy}$ based on the associated pairwise homography matrix. The detected outlier point correspondences may comprise noise and are removed from the associated feature point correspondences $\varphi_{noisy}$ to generate the set of inlier point correspondences $\varphi$.

In accordance with an embodiment of the present disclosure, the one or more hardware processors 104 of FIG. 1 are configured to estimate, at step 210, a global homography for each overlapped image of each pair of the overlapped images, based on the associated pairwise homography matrix and the associated set of inlier point correspondences $\varphi$.

The Direct Linear Transformation (DLT) method with the Random Sampling Consensus (RANSAC) process may generate erroneous pairwise homography matrix and hence resulting in erroneous global homography. In an embodiment, a cost function $C_w$ is defined based on the non-linear least-square optimization for better estimation of the global homography for each overlapped image of each pair of the overlapped images. Then the plurality of overlapped images are aligned based on the associated global homography and the cost function $C_w$ to generate an initial stitched image, where the associated global homography for each overlapped image of each pair of the overlapped images is estimated such that the associated cost function $C_w$ comprises a minimum value.

In an embodiment, the cost function $C_w$ defines a transformation error in the feature point correspondences of the associated pair of the overlapped images in the initial stitched image and an error in pairwise homography calculated based on the global homography of the associated pair of overlapped images.

In an embodiment, the cost function $C_w$ is defined according to a relation:

$$C_w = \Sigma_{I_s, I_d \in \theta} \Sigma_{i \in \varphi} |(H_d^{-1} H_s) x_i - x_i'|^2 + \lambda * \text{Frob}(H_{sd}, (H_d^{-1} H_s)) \quad (1)$$

wherein $I_s$ and $I_d$ represents an image pair to be stitched, $\theta$ represents a set of image pairs from the plurality of the overlapped images, $x_i$ and $x_i'$ represents a $i^{th}$ pair of matching feature point in the images $I_s$ and $I_d$ respectively, $H_s$ represents a global homography from the image $I_s$ to the initial stitched image, $H_d$ represents a global homography from the image $I_d$ to the initial stitched image, $H_{sd}$ represents a pairwise homography matrix, $H_d^{-1}$ represents a global homography from the initial stitched image to the image $I_d$, Frob( ) represents a Frobenius norm, and $\lambda$ represents a balancing weight.

In an embodiment, the first part of the equation (1) calculates the transformation error after aligning the feature points from image $I_s$ to the initial stitched image and subsequently from the initial stitched image to the image $I_d$ using the global homography $H_s$ and $H_d$. The second part of the equation (1) constrains the global homographies which restricts the homography estimation unboundedly. In an embodiment, the equation (1) estimates the global homographies $H_s$ and $H_d^{-1}$ such that the associated cost function $C_w$ comprises the minimum value.

Figure 3:
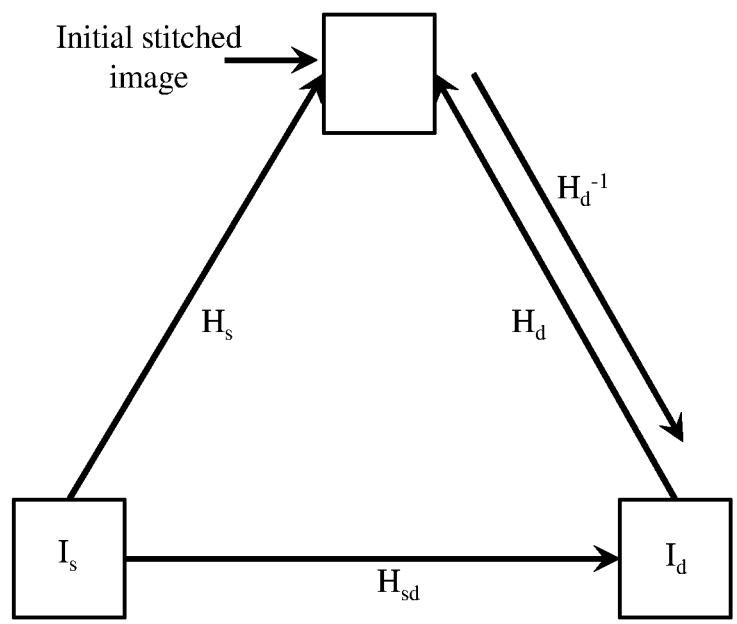
FIG. 3 depicts a relation between global homography of an overlapped image and a pairwise homography matrix of an overlapped image pair, in accordance with an embodiment of the present disclosure.

FIG. 3 depicts a relation between global homography of an overlapped image and a pairwise homography matrix of an overlapped image pair, in accordance with an embodiment of the present disclosure. According to the FIG. 3, $I_s$ and $I_d$ represent an image pair to be stitched from a set $\theta$ of image pairs from the plurality of the overlapped images to generate an initial stitched image, $H_{sd}$ represents the pairwise homography matrix, $H_s$ represents the global homography mapped from the image $I_s$ to the initial stitched image, $H_d$ represents the global homography mapped from the image $I_d$ to the initial stitched image, and $H_d^{-1}$ represents the global homography mapped from the initial stitched image to the image $I_d$.

In accordance with an embodiment of the present disclosure, the one or more hardware processors 104 of FIG. 1 are configured to minimize, at step 212, a multi-constraint cost function $C_L$ with a local warping technique to reduce misalignments in overlapped regions and the edge boundaries of the initial stitched image, to generate a refined stitched image.

In an embodiment, the initial stitched image generated after aligning the plurality of overlapped images based on the associated global homography and the cost function $C_w$, may comprises misalignments in the overlapped regions and the edge boundaries due to the noise in the set of inlier point correspondences $\varphi$ and the associated pairwise homography matrix. So the local warping technique is applied on the generated initial stitched image to rectify the misalignments on the overlapped regions and the edge boundaries to generate the refined stitched image. The multi-constraint cost function $C_L$ is defined for the local warping technique such that the misalignments in the overlapped regions and the edge boundaries are rectified in the refined stitched image to the maximum extent possible by minimizing the multi-constraint cost function $C_L$.

In an embodiment, the multi-constraint cost function $C_L$ is defined according to a relation:

$$C_L = C_D + \delta_1 C_P + \delta_2 C_G \quad (2)$$

wherein $C_D$ represents a data terms cost function, $C_P$ represents a photometric terms cost function and $C_G$ represents a geometric smoothness terms cost function, $\delta_1$ and $\delta_2$ are balancing weights. The data terms cost function $C_D$ and the photometric terms cost function $C_P$ may rectify the misalignments in the overlapped regions and the edge boundaries for each image pair and the geometric smoothness terms cost function $C_G$ ensures smoothness in object geometry in the overlapped regions and the edge boundaries for each image pair. In an embodiment, the multi-constraint cost function $C_L$ is converged when an average change in pixel movement is below to a single pixel.

The data terms cost function $C_D$ minimizes misalignments in the feature point correspondences present in a predefined window of the overlapped regions and the edge boundaries of the initial stitched image, by reducing a distance between a mid-point of the associated feature point correspondences and the associated feature point correspondences.

In an embodiment, let an aligned image pair be $I_s^{al}$ and $I_d^{al}$ as input images and $I_s^o$ and $I_d^o$ are corresponding output warped images, then the mid-point $x_i^m$ of $i^{th}$ feature point correspondence on input aligned image pair $I_s^{al}$ and $I_d^{al}$, and corresponding output warped images $I_s^o$ and $I_d^o$ is calculated using the data terms cost function $C_D$ defined according to a relation:

$$C_D = \Sigma_{i \in \varphi} |x_i^{os} - x_i^m|^2 + |x_i^{od} - x_i^m|^2 \quad (3)$$

wherein $x_i^{os}$ and $x_i^{od}$ represents warped feature point correspondences in output warped images $I_s^o$ and $I_d^o$.

The mid-point $x_i^m$ of the associated feature point correspondences and the associated feature point correspondences is calculated by minimizing the data terms cost function $C_D$ as defined in the equation 3. Nine corner points $P_{ij}$ (j=1, 2, . . . , 9) within a 12×12 window around the $i^{th}$ feature point correspondence $\forall_i \in \varphi$ on the input aligned image pair $I_s^{al}$ and $I_d^{al}$ and representing $i^{th}$ feature point are taken with a bicubic interpolation of an enclosed region where nine corner points are present. The warped feature point correspondences $x_i^{os}$ and $x_i^{od}$ are calculated according to a below relation:

$$x_i^o = \sum_{j=1}^{9} w_{i,j}^T P_{ij}^o$$

where vector $w_{i,j}$ represent bicubic interpolation coefficients.

In an embodiment, the photometric terms cost function $C_P$ minimizes an intensity difference among sample pixel points in the overlapped regions and pixel points on the edge boundaries of the overlapping regions of each image pair, using the bicubic interpolation.

In an embodiment, a point set is created using sampled pixel points in the overlapped regions and all pixel points on the edge boundaries of the overlapping regions. The photometric terms cost function $C_P$ is defined according to a relation:

$$C_P = \Sigma_k |I_s(x_k^o) - I_d(x_k)|^2 \quad (4)$$

wherein $x_k$ represents a $k^{th}$ sample pixel point where $k \in \beta$ and $x_k^o$ represents a corresponding warped point obtained from a bicubic interpolation, $I_s(x_k^o)$ and $I_d(x_k)$ represents intensity of images $I_s$ and $I_d$, $\beta$ is the point set derived using sampled pixel points in the overlapped regions and pixel points on the edge boundaries of the overlapping regions. The intensities $I_s(x_k^o)$ and $I_d(x_k)$ of images $I_s$ and $I_d$ are set by minimizing the photometric terms cost function $C_P$.

In an embodiment, the geometric smoothness terms cost function $C_G$ minimize a difference between a warped corner point of a triangular mesh and a corner point calculated from other two warped corner points in the triangle mesh in the overlapping regions, wherein the corner point is linearly dependent on the other two warped corner points.

Figure 4:
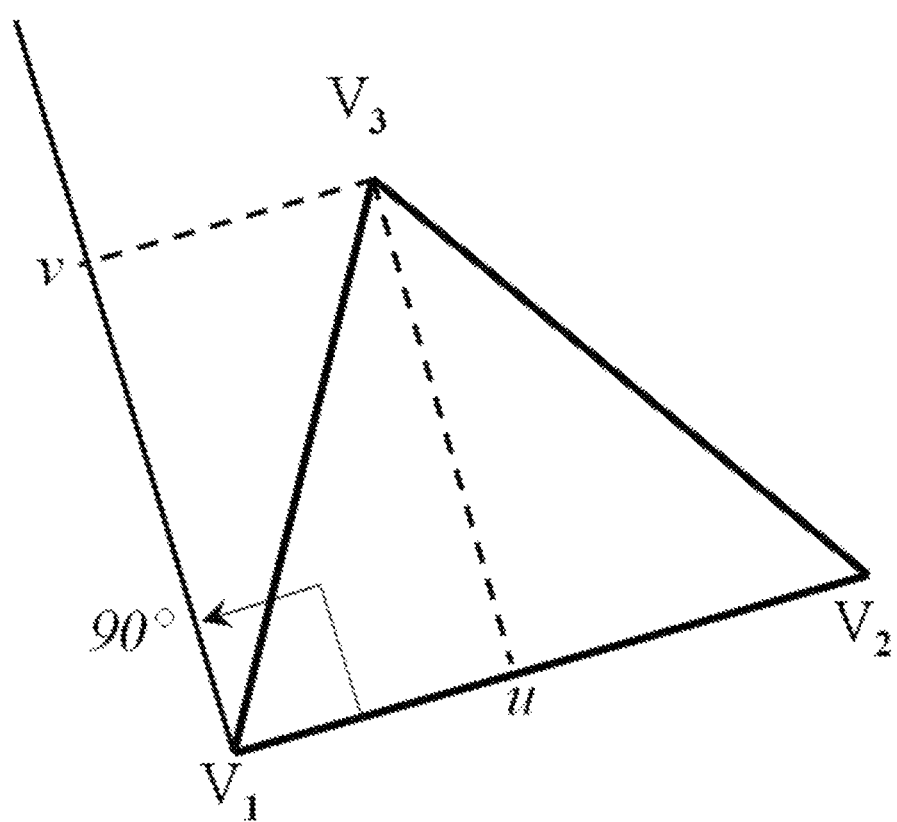
FIG. 4 depicts a triangle mesh for calculating a warped corner point that is linearly dependent on other two warped corner points in overlapping regions of a stitched image, in accordance with an embodiment of the present disclosure.

In an embodiment, a unique mesh model is used and a point set Ø is created by choosing uniformly sampled points on the edge boundary of the overlapping regions along with the matched feature point correspondences. In an embodiment, the triangular mesh is created by a Delaunay triangulation using points in the point set Ø which represents a geometric structure of the overlapping regions. FIG. 4 depicts a triangle mesh for calculating a warped corner point that is linearly dependent on other two warped corner points in overlapping regions of a stitched image, in accordance with an embodiment of the present disclosure. Any triangle of mesh is represented as $\Delta V_1 V_2 V_3$ where $V_3$ is linearly dependent on $V$ and $V_2$.

In an embodiment, the geometric smoothness terms cost function $C_G$ is defined according to a relation:

$$C_G = \Sigma_{t=1}^{\Delta_n} |V_3^o - V_3^{o\prime}|^2 \quad (5)$$

wherein $V_3^o$ represents a warped corner point and linearly dependent on other two warped corner points $V_1^o$ and $V_3^o$ of a warped triangle $\Delta V_1^o V_2^o V_3^o$ of the mesh in the overlapping regions, $\Delta_n$ represents a number of triangles present in the mesh, $V_3^{o\prime}$ represents a calculated corner point based on $V_1^o$ and $V_2^o$, and determined according to a relation:

$$V_3^{o\prime} = V_1^o + u(V_2^o - V_1^o) + v \begin{bmatrix} 0 & 1 \\ -1 & 0 \end{bmatrix}(V_2^o - V_1^o)$$

where u and v are two scalars.

Thus, by minimizing the multi-constraint cost function $C_L$ with a local warping technique, the misalignments in the overlapped regions and the edge boundaries of the initial stitched image are reduced to generate the refined stitched image. In an embodiment a pyramidal blending is applied before generating the refined stitched image to blend the image objects with different sizes in unique format.

Experiment Results:

An Intel i7-8700 (6 cores @3.7-4.7 GHz) processor was used to implement the disclosed method in C++ language. It was observed that an average warp estimation time between a pair of images having 1024×720 resolution was 3-4 seconds and majority of the time was spent on detecting feature points and matching the detected feature points to estimate feature point correspondences. To evaluate both qualitative and quantitative performance, the disclosed method was compared with three feature based state-of-art methods with a publicly available dataset comprising low-texture images and ordinary images with texture. Table.1 below shows RMSE error comparison among APAP (as-projective-as-possible method), DF-W (Dual-Feature Warping based motion model estimation), MCC (multiple combined constraint method) and the present disclosure, for various parallax images dataset where each data in the dataset has multiple images with at least 30% amount of the overlapping. According to the Table.1, the present disclosure performed better than the three feature based state-of-art methods.

TABLE 1

| Data | APAP | DF-W | MCC | Method of the present disclosure |
| --- | --- | --- | --- | --- |
| Temple | 6.39 | 3.39 | 2.57 | 3.105 |
| School | 12.20 | 9.89 | 10.85 | 9.736 |
| Outdoor | 11.90 | 9.52 | 6.75 | 7.433 |
| Rail | 14.80 | 10.58 | 9.81 | 8.317 |
| Building | 6.68 | 4.49 | 3.74 | 3.698 |
| Square | 19.90 | 16.83 | 12.55 | 10.255 |
| House | 19.80 | 19.57 | 14.57 | 13.113 |
| Courtyard | 38.30 | 36.23 | 29.17 | 30.258 |
| Villa | 6.72 | 5.20 | 5.41 | 5.332 |
| Girl | 5.20 | 4.81 | 5.05 | 4.726 |
| Park | 11.07 | 8.18 | 5.85 | 7.528 |
| road | 2.28 | 4.59 | 1.67 | 1.917 |

From the Table.1, it is observed that the DF-W has performed with better homography estimation than a single point feature used in the APAP method. But outdoor datasets where a large amount of feature points present, the feature based homography estimation was very accurate. It may be observed that the accuracy of global homography estimation increases with number of matched feature points and the present disclosure has estimated the global homography using only feature points where the feature points are included from both the edge boundaries using the bi-directional optical flow method and the feature point correspondences using the scale-invariant feature transform (SIFT) algorithm that yielded better homography estimation.

Figure 5A:
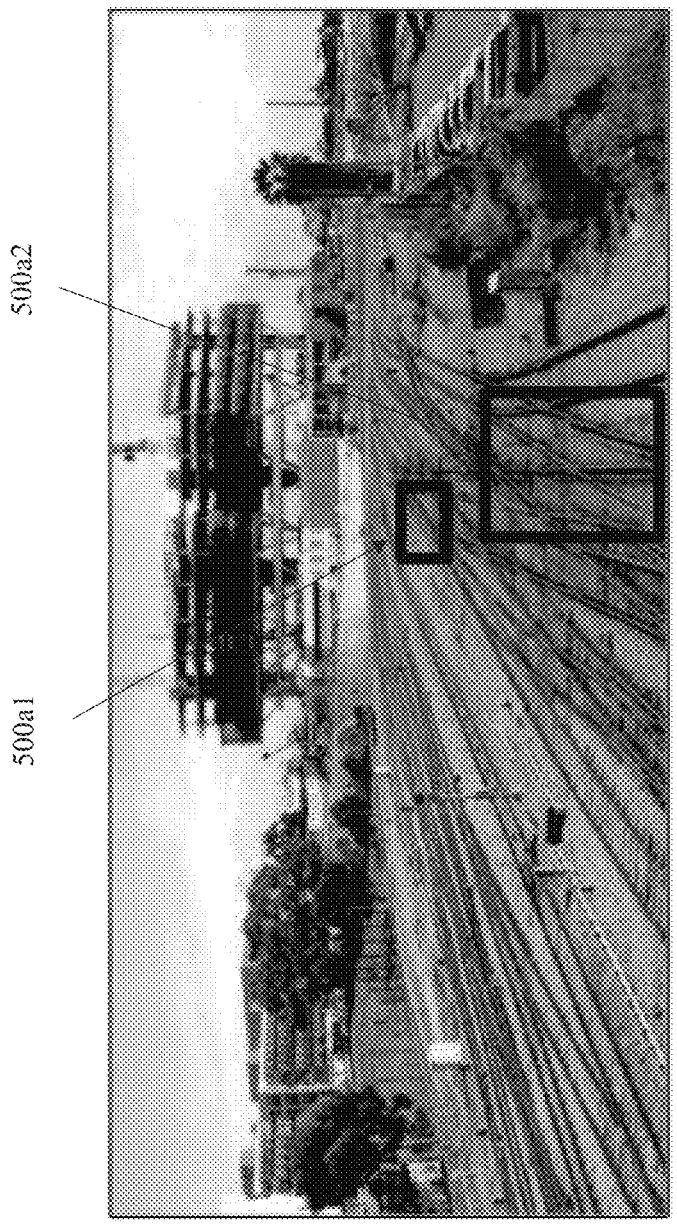
FIG. 5A and FIG. 5B depict a qualitative comparison of a refined stitched image using a Dual-Feature Warping (DF-W) based motion model estimation known in the art and using the method of FIG. 2A and FIG. 2B in accordance with an embodiment of the present disclosure, respectively.
Figure 5B:
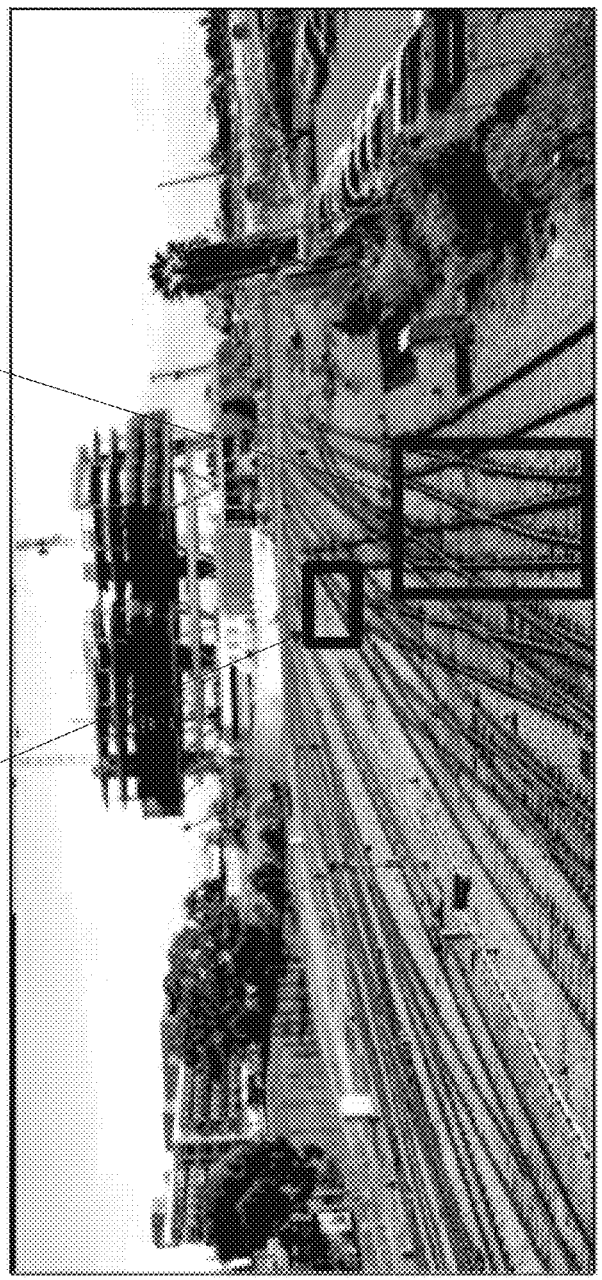
Figure 5C:
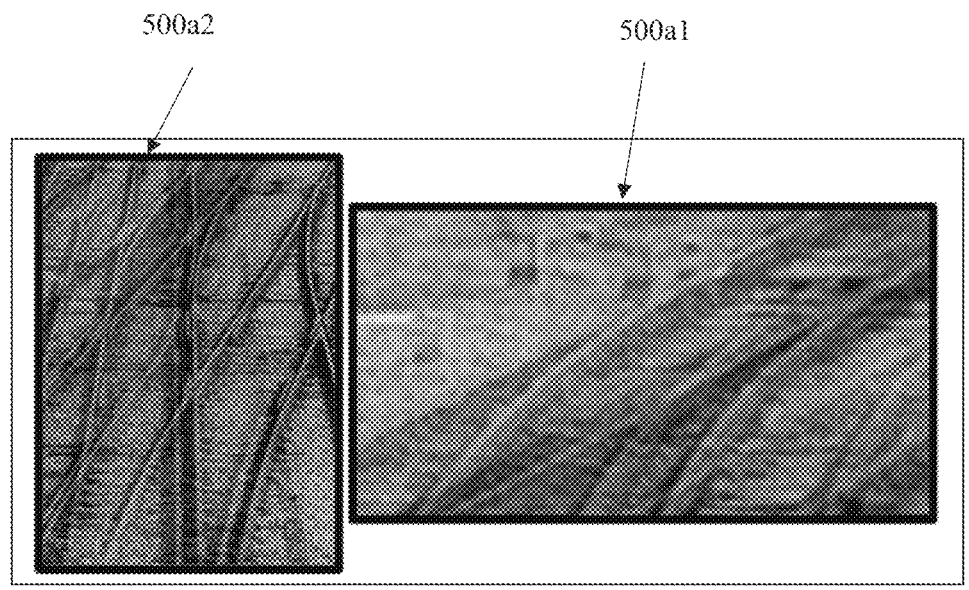
FIG. 5C depicts an enlarged version of portions 500a1 and 500a2 of FIG. 5A in accordance with a Dual-Feature Warping (DF-W) based motion model estimation known in the art.
Figure 5D:
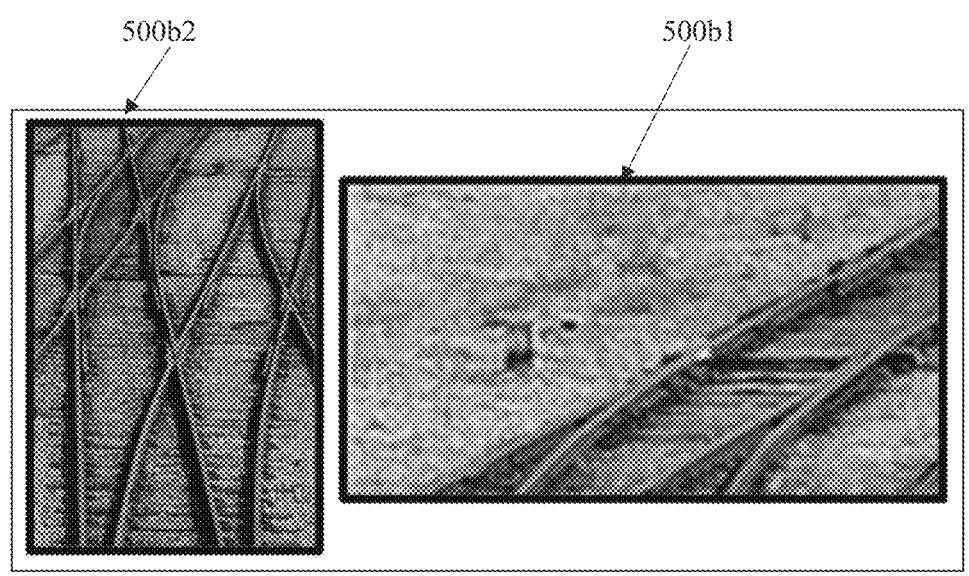
FIG. 5D depicts an enlarged version of portions 500b1 and 500b2 of FIG. 5B in accordance with an embodiment of the present disclosure.

FIG. 5A and FIG. 5B depict a qualitative comparison of a refined stitched image using a Dual-Feature Warping (DF-W) based motion model estimation known in the art and using the method of FIG. 2A and FIG. 2B in accordance with an embodiment of the present disclosure, respectively. The depicted refined stitched image comprises a rail data where multiple rail tracks are merged. Portions 500a1 and 500a2 of FIG. 5A and portions 500b1 and 500b2 of FIG. 5B correspond to identical portions of a source image pertaining the multiple rail tracks, which have been further analysed using the two methods. FIG. 5C depicts an enlarged version of portions 500a1 and 500a2 of FIG. 5A in accordance with a Dual-Feature Warping (DF-W) based motion model estimation known in the art, and FIG. 5D depicts an enlarged version of portions 500b1 and 500b2 of FIG. 5B in accordance with an embodiment of the present disclosure. It may be noted that significant amount of misalignments are present in the stitched image generated by the DF-W based motion model estimation as depicted in FIG. 5C, whereas the rail tracks were perfectly aligned in the stitched image generated using the method of the present disclosure as depicted in FIG. 5D.

Figure 6A:
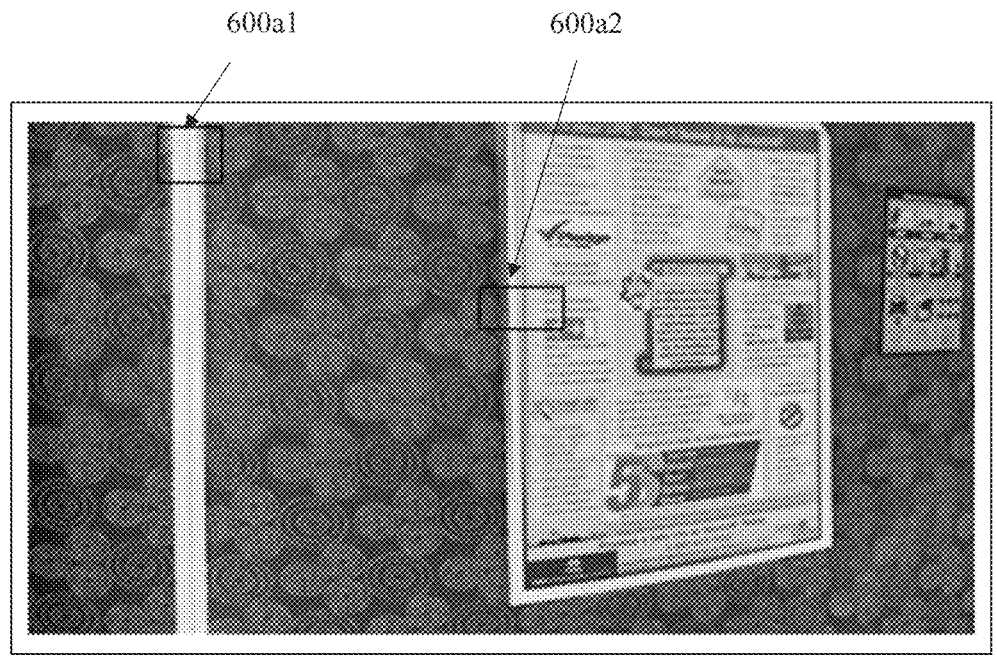
FIG. 6A through FIG. 6C depict a qualitative comparison of a refined stitched image with: (i) the global homography with associated first set of matched feature point correspondences $\psi_1$ instead of the feature point correspondences $\varphi_{noisy}$ and blending (ii) the feature point correspondences $\varphi_{noisy}$ and the data terms cost function $C_D$ and the photometric terms cost function $C_P$ and (iii) the feature point correspondences $\varphi_{noisy}$ and the multi-constraint cost function $C_L$ respectively, in accordance with an embodiment of the present disclosure.
Figure 6B:
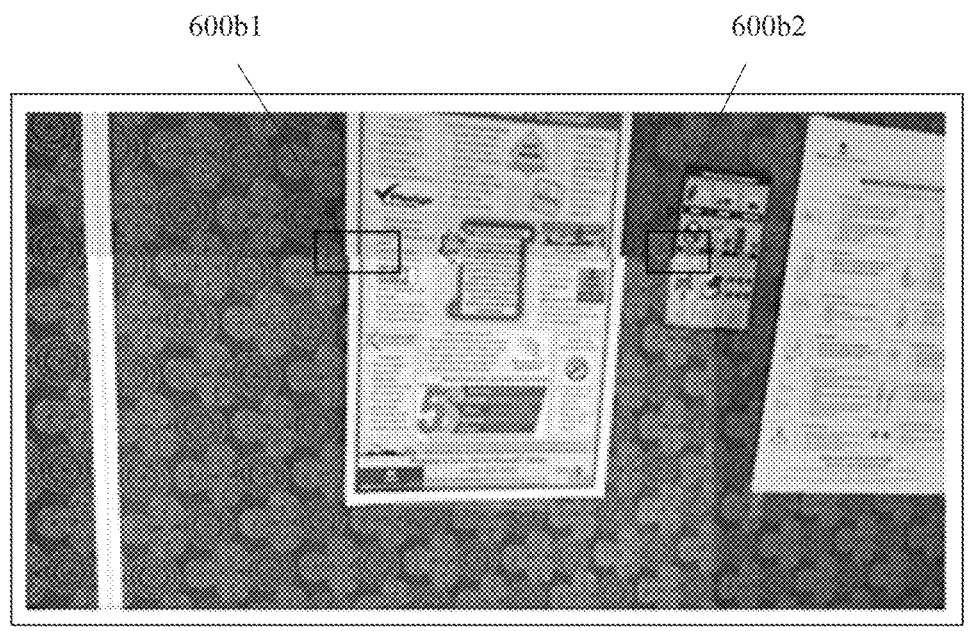
Figure 6C:
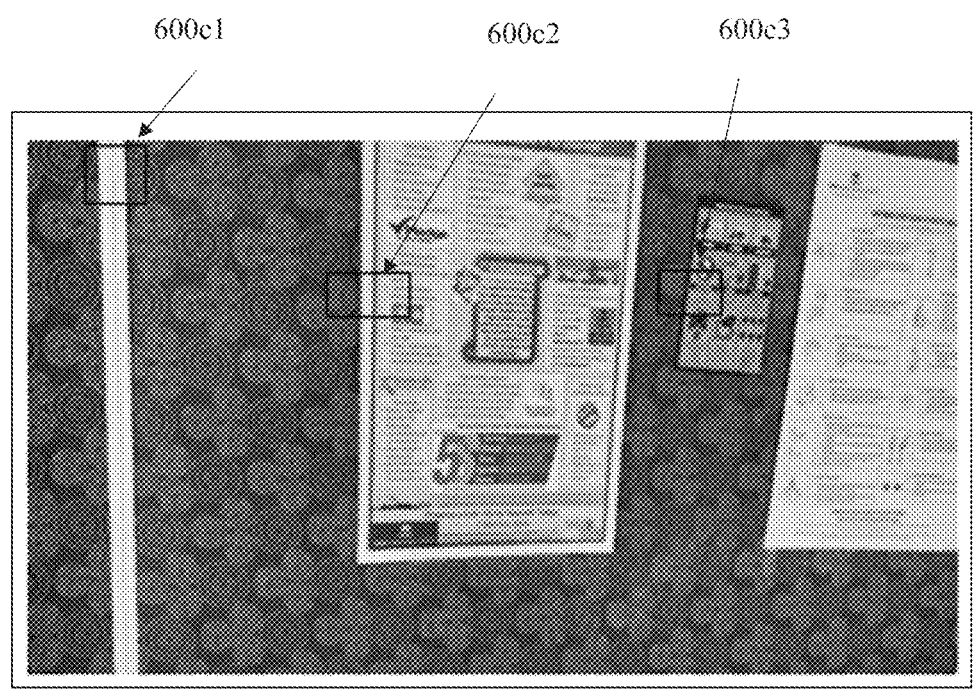
Figure 6D:
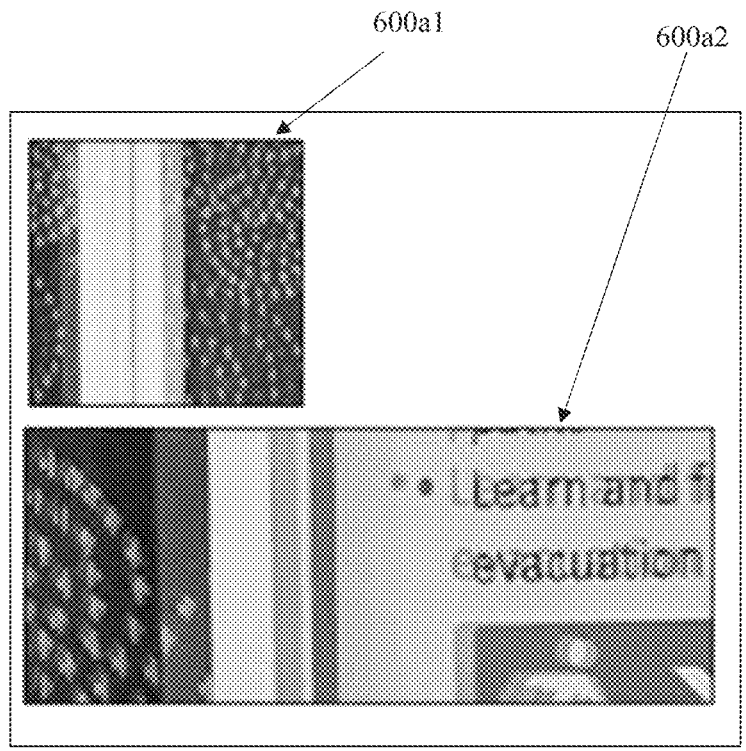
FIG. 6D depicts an enlarged version of portions 600a1 and 600a2 of FIG. 6A with the global homography with associated first set of matched feature point correspondences $\psi_1$ instead of the feature point correspondences $\varphi_{noisy}$ and blending, in accordance with an embodiment of the present disclosure.
Figure 6E:
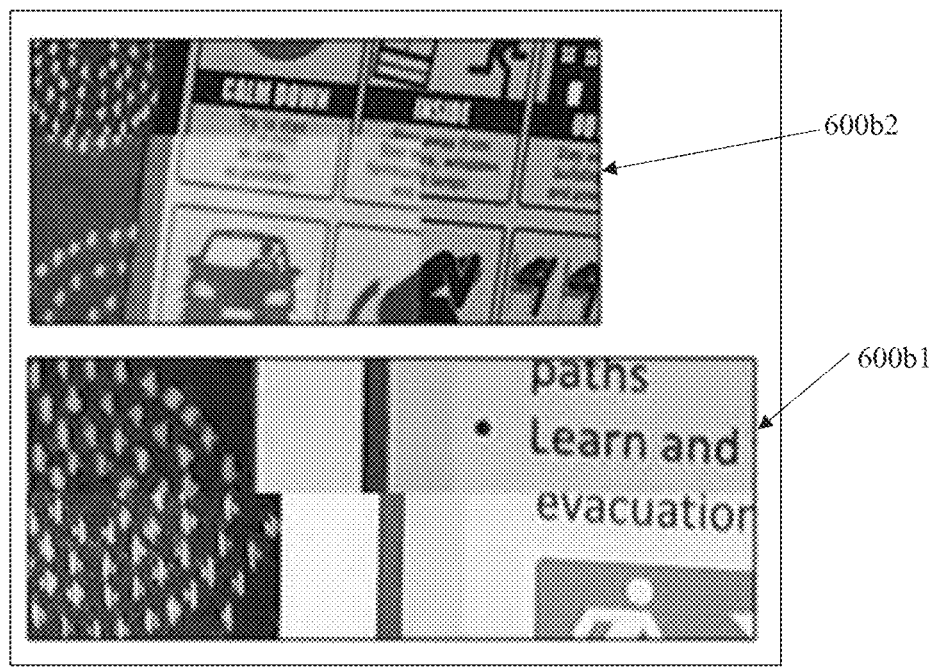
FIG. 6E depicts an enlarged version of portions 600b1 and 600b2 of FIG. 6B with the feature point correspondences $\varphi_{noisy}$ and the data terms cost function $C_D$ and the photometric terms cost function $C_P$, in accordance with an embodiment of the present disclosure.
Figure 6F:
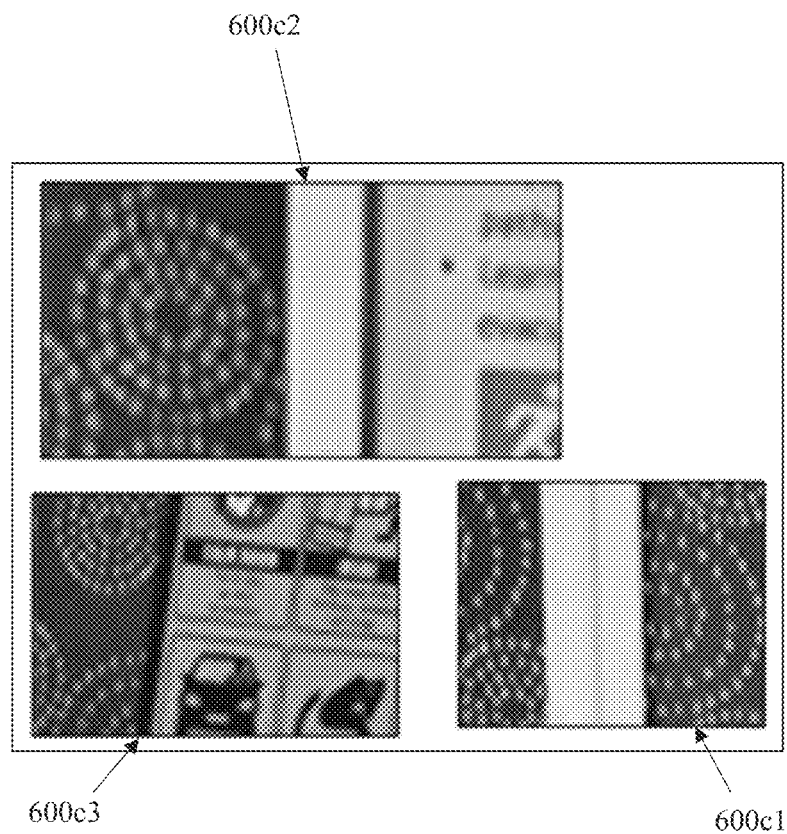
FIG. 6F depicts an enlarged version of portions 600c1, 600c2 and 600c3 of FIG. 6C with the feature point correspondences $\varphi_{noisy}$ and the multi-constraint cost function $C_L$, in accordance with an embodiment of the present disclosure.

FIG. 6A through FIG. 6C depict a qualitative comparison of a refined stitched image with: (i) the global homography with associated first set of matched feature point correspondences $\psi_1$ instead of the feature point correspondences $\varphi_{noisy}$ and blending (ii) the feature point correspondences $\varphi_{noisy}$ and the data terms cost function $C_D$ and the photometric terms cost function $C_P$ and (iii) the feature point correspondences $\varphi_{noisy}$ and the multi-constraint cost function $C_L$ respectively, in accordance with an embodiment of the present disclosure. FIG. 6D depicts an enlarged version of portions 600a1 and 600a2 of FIG. 6A with the global homography with associated first set of matched feature point correspondences $\psi_1$ instead of the feature point correspondences $\varphi_{noisy}$ and blending, in accordance with an embodiment of the present disclosure. FIG. 6E depicts an enlarged version of portions 600b1 and 600b2 of FIG. 6B with the feature point correspondences $\varphi_{noisy}$ and the data terms cost function $C_D$ and the photometric terms cost function $C_P$, in accordance with an embodiment of the present disclosure. FIG. 6F depicts an enlarged version of portions 600c1, 600c2 and 600c3 of FIG. 6C with the feature point correspondences $\varphi_{noisy}$ and the multi-constraint cost function $C_L$, in accordance with an embodiment of the present disclosure.

FIG. 6A refers to a stitched blended image and it may be noted that the global homography estimation is erroneous as shown in FIG. 6D through enlarged version of portions 600a1 and 600a2. FIG. 6B refers to a stitched image without blending and it may be noted that the edges and the overlapping region were not aligned as shown in FIG. 6E through enlarged version of portions 600b1 and 600b2, due to lack of the matched feature points. FIG. 6C refers to a stitched image without any misalignments as shown in FIG. 6F through enlarged version of portions 600c1, 600c2 and 600c3.

In accordance with the present disclosure, the system 100 and the method 200 facilitates generation of stitched image using low-texture images or ordinary images with texture, from the plurality of the overlapped images with relatively better accuracy than the methods of the prior art. The present disclosure is useful for investigation and conducting measurements pertaining to big structures such as rail track, bridge and so on.

In accordance with the present disclosure, the method 200 comprises multiple models or techniques to generate the refined stitched image. The multiple models or techniques may include the non-linear optimization, the local warping technique, the mesh model and the blending technique.

In accordance with the present disclosure, the non-linear optimization determines the global homography for each image using the cost function $C_w$ based on the estimated pairwise homography matrix and the feature point correspondences for each image pair. Thus the technical problems of the lens distortion and the parallax errors have been overcome in the initial stitched image. Then the local warping based image alignment is applied on the initial stitched image using the multi-constraint cost function minimization to rectify the misalignments and to mitigate aberrations caused by noises in the global homography estimation, to generate the accurate refined stitched image. The multi-constraint cost function minimization ensures to achieve better alignments and smooth structure-preserving in the refined stitched image. The multi-constraint cost function is a simple function comprising only three constraints namely the data term, the photometric term and the geometric smoothness terms and it converges when the average change in pixel movement is below to a single pixel in the overlapping regions. The photometric term ensures the intensities in the overlapping regions of the refined stitched image are corrected. From Table.1, it is noted that the present disclosure produced relatively accurate refined stitched images for most of the datasets with minimum alignment error compared to the state of the art methods.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by the one or more processors described herein after may be implemented in one or more modules.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium"

should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer implemented method for stitching overlapped images of a scene, the method comprising the steps of:
   receiving a plurality of the overlapped images of the scene;
   forming a list of pairs of the overlapped images from the plurality of the overlapped images, wherein each pair of the overlapped images comprises a unique pair of the overlapped images;
   determining feature point correspondences $\varphi_{noisy}$, for each pair of the overlapped images in the list, based on an associated first set of matched feature point correspondences $\psi_1$ and an associated second set of matched feature point correspondences $\psi_2$;
   generating a pairwise homography matrix and a set of inlier point correspondences $\varphi$, for each pair of the overlapped images based on associated feature point correspondences $\varphi_{noisy}$, using a Direct Linear Transformation (DLT) method with a Random Sampling Consensus (RANSAC) process, wherein the set of inlier point correspondences $\varphi$ are generated by removing outlier point correspondences from the associated feature point correspondences $\varphi_{noisy}$ based on the associated pairwise homography matrix;
   estimating a global homography for each overlapped image of each pair of the overlapped images, based on the associated pairwise homography matrix and the associated set of inlier point correspondences $\varphi$, using a cost function $C_w$ with a non-linear least-square optimization, to generate an initial stitched image, wherein the global homography for each overlapped image of each pair of the overlapped images is estimated such that the cost function $C_w$ comprises a minimum value and wherein a pyramidal blending is applied before generating the refined stitched image to blend the image objects with one or more sizes in an unique format; and
   minimizing a multi-constraint cost function $C_L$ with a local warping technique to reduce misalignments in overlapped regions and edge boundaries of the initial stitched image, to generate a refined stitched image, wherein the multi-constraint cost function $C_L$ comprises a data terms cost function $C_D$, a photometric terms cost function $C_P$ and a geometric smoothness terms cost function $C_G$.

2. The method of claim 1, wherein the first set of matched feature point correspondences $\psi\_1$ for each pair of the overlapped images, are extracted using a scale-invariant feature transform (SIFT) algorithm and a VLFeat method.

3. The method of claim 1, wherein the second set of matched feature point correspondences $\psi\_2$ from the edge boundaries of each pair of the overlapped images are extracted using a bi-directional optical flow method.

4. The method of claim 1, wherein the cost function $C\_w$ defines a transformation error in the feature point correspondences of the associated pair of the overlapped images in the initial stitched image and an error in pairwise homography calculated based on the global homography of the associated pair of overlapped images.

5. The method of claim 1, wherein the cost function $C_w$ is defined according to a relation:

$$C_w = \sum_{I_s, I_d \in \theta} \sum_{i \in \varphi} |(H_d^{-1} H_s) x_i - x_i'|^2 + \lambda * Frob(H_{sd}, (H_d^{-1} H_s))$$

wherein $I_s$ and $I_d$ represents an image pair to be stitched, $\theta$ represents a set of image pairs from the plurality of the overlapped images, $x_i$ and $x_i'$ represents a $i^{th}$ pair of matching feature point in the images $I_s$ and $I_d$ respectively, $H_s$ represents a global homography from the image $I_s$ to the initial stitched image, $H_d$ represents a global homography from the image $I_d$ to the initial stitched image, $H_{sd}$ represents a pairwise homography matrix, $H_d^{-1}$ represents a global homography from the initial stitched image to the image $I_d$, Frob( ) represents a Frobenius norm, and $\lambda$ represents a balancing weight.

6. The method of claim 1, wherein the multi-constraint cost function $C_L$ is defined according to a relation:

$$C_L = C_D + \delta_1 C_P + \delta_2 C_G$$

wherein $\delta_1$ and $\delta_2$ represent balancing weights.

7. The method of claim 1, wherein the data terms cost function $C_D$ minimizes misalignments in the feature point correspondences present in a predefined window of the overlapped regions and the edge boundaries of the initial stitched image, by reducing a distance between a mid-point of the associated feature point correspondences and the associated feature point correspondences.

8. The method of claim 1, wherein the data terms cost function $C_D$ is defined according to a relation:

$$C_D = \sum_{i \in \varphi} |x_i^{os} - x_i^m|^2 + |x_i^{od} - x_i^m|^2$$

wherein $x_i^{os}$ and $x_i^{od}$ represent warped feature point correspondences in output warped images $I_s^o$ and $I_d^o$, and $x_i^m$ represents a mid-point of $i^{th}$ feature point correspondence on input aligned image pair $I_s^{al}$ and $I_d^{al}$, and corresponding output warped images $I_s^o$ and $I_d^o$.

9. The method of claim 1, wherein the photometric terms cost function $C_P$ minimizes an intensity difference among sample pixel points in the overlapped regions and pixel points on the edge boundaries of the overlapping regions, using a bicubic interpolation.

10. The method of claim 1, wherein the photometric terms cost function $C_P$ is defined according to a relation:

$$C_P = \sum_k |I_S(x_k^o) - I_d(x_k)|^2$$

wherein $x_k$ represents a $k^{th}$ sample pixel point where $k \in \beta$ and $x_k^o$ represents a corresponding warped point obtained from a bicubic interpolation, $I_s(x_k^o)$ and $I_d(x_k)$ represents intensity of images $I_s$ and $I_d$, $\beta$ represents a point set derived using sampled pixel points in the overlapped regions and pixel points on the edge boundaries of the overlapping regions.

11. The method of claim 1, wherein the geometric smoothness terms cost function $C_G$ minimize a difference between a warped corner point of a triangular mesh and a corner point calculated from other two warped corner points in the triangle mesh in the overlapping regions, wherein the corner point is linearly dependent on the other two warped corner points.

12. The method of claim 1, wherein the geometric smoothness terms cost function $C_G$ is defined according to a relation:

$$C_G = \sum_{t=1}^{\Delta_n} |V_3^o - V_3^{o'}|^2$$

wherein $V_3^o$ represents a warped corner point and linearly dependent on other two warped corner points $V_1^o$ and $V_2^o$ of a warped triangle $\Delta V_1^o V_2^o V_3^o$ of a mesh in the overlapping regions, $\Delta_n$ represents a number of triangles present in the mesh, $V_3^{o'}$ represents a calculated corner point based on $V_1^o$ and $V_2^o$, and determined according to a relation:

$$V_3^{o'} = V_1^o + u(V_2^o - V_1^o) + v \begin{bmatrix} 0 & 1 \\ -1 & 0 \end{bmatrix}(V_2^o - V_1^o)$$

where u and v represent two scalars.

13. A system for stitching overlapped images of a scene, the system comprising:
  one or more data storage devices operatively coupled to one or more hardware processors and configured to store instructions which when executed cause the one or more hardware processors to:
    receive a plurality of the overlapped images of the scene;
    form a list of pairs of the overlapped images from the plurality of the overlapped images, wherein each pair of the overlapped images comprises a unique pair of the overlapped images;
    determine feature point correspondences $\varphi_{noisy}$, for each pair of the overlapped images in the list, based on an associated first set of matched feature point correspondences $\psi_1$ and an associated second set of matched feature point correspondences $\psi_2$;
    generate a pairwise homography matrix and a set of inlier point correspondences $\varphi$, for each pair of the overlapped images based on associated feature point correspondences $\varphi_{noisy}$, using a Direct Linear Transformation (DLT) method with a Random Sampling Consensus (RANSAC) process, wherein the set of inlier point correspondences $\varphi$ are generated by removing outlier point correspondences from the associated feature point correspondences $\varphi_{noisy}$ based on the associated pairwise homography matrix;
    estimate a global homography for each overlapped image of each pair of the overlapped images, based on the associated pairwise homography matrix and the associated set of inlier point correspondences $\varphi$, using a cost function $C_w$ with a non-linear least-square optimization, to generate an initial stitched image, wherein the global homography for each overlapped image of each pair of the overlapped images is estimated such that the cost function $C_w$ comprises a minimum value and wherein a pyramidal blending is applied before generating the refined stitched image to blend the image objects with one or more sizes in an unique format; and
    minimize a multi-constraint cost function $C_L$ with a local warping technique to reduce misalignments in overlapped regions and edge boundaries of the initial stitched image, to generate a refined stitched image, wherein the multi-constraint cost function $C_L$ comprises a data terms cost function $C_D$, photometric terms cost function $C_P$ and geometric smoothness terms cost function $C_G$.

14. The system of claim 13, wherein the one or more hardware processors are configured to extract the first set of matched feature point correspondences $\psi_1$ for each pair of the overlapped images, using a scale-invariant feature transform (SIFT) algorithm and a VLFeat method.

15. The system of claim 13, wherein the one or more hardware processors are configured to extract the second set of matched feature point correspondences $\psi_2$ from the edge boundaries of each pair of the overlapped images, using a bi-directional optical flow method.

16. The system of claim 13, wherein the cost function $C_w$ defines a transformation error in the feature point correspondences of the associated pair of the overlapped images in the initial stitched image and an error in pairwise homography calculated based on the global homography of the associated pair of the overlapped images.

17. The system of claim 13, wherein the data terms cost function $C_D$ minimizes misalignments in the feature point correspondences present in a predefined window of the overlapped regions and the edge boundaries of the initial stitched image, by reducing a distance between a mid-point of the associated feature point correspondences and the associated feature point correspondences.

18. The system of claim 13, wherein the photometric terms cost function $C_P$ minimizes an intensity difference among sample pixel points in the overlapped regions and pixel points on the edge boundaries of the overlapping regions, using a bicubic interpolation.

19. The system of claim 13, wherein the geometric smoothness terms cost function $C_G$ minimize a difference between a warped corner point of a triangular mesh and a corner point calculated from other two warped corner points in the triangle mesh in the overlapping regions, wherein the corner point is linearly dependent on the other two warped corner points.

20. A computer program product comprising a non-transitory computer readable medium having a computer readable program embodied therein, wherein the computer readable program, when executed on a computing device, causes the computing device to:
  receive a plurality of the overlapped images of the scene;
  form a list of pairs of the overlapped images from the plurality of the overlapped images, wherein each pair of the overlapped images comprises a unique pair of the overlapped images;
  determine feature point correspondences $\varphi_{noisy}$, for each pair of the overlapped images in the list, based on an associated first set of matched feature point correspondences $\psi_1$ and an associated second set of matched feature point correspondences $\psi_2$;
  generate a pairwise homography matrix and a set of inlier point correspondences $\varphi$, for each pair of the overlapped images based on associated feature point correspondences $\varphi_{noisy}$, using a Direct Linear Transformation (DLT) method with a Random Sampling Consensus (RANSAC) process, wherein the set of inlier point correspondences φ are generated by removing outlier point correspondences from the associated feature point correspondences $\varphi_{noisy}$ based on the associated pairwise homography matrix;

estimate a global homography for each overlapped image of each pair of the overlapped images, based on the associated pairwise homography matrix and the associated set of inlier point correspondences φ, using a cost function $C_w$ with a non-linear least-square optimization, to generate an initial stitched image, wherein the global homography for each overlapped image of each pair of the overlapped images is estimated such that the cost function $C_w$, comprises a minimum value and wherein a pyramidal blending is applied before generating the refined stitched image to blend the image objects with one or more sizes in an unique format; and minimize a multi-constraint cost function $C_L$ with a local warping technique to reduce misalignments in overlapped regions and edge boundaries of the initial stitched image, to generate a refined stitched image, wherein the multi-constraint cost function $C_L$ comprises a data terms cost function $C_D$, photometric terms cost function $C_P$ and geometric smoothness terms cost function $C_G$.

* * * * *